United States Patent
Zhang et al.

(10) Patent No.: US 10,351,640 B2
(45) Date of Patent: *Jul. 16, 2019

(54) FORMATION OF ZIEGLER-NATTA CATALYST USING NON-BLENDED COMPONENTS

(75) Inventors: Lei Zhang, Seabrook, TX (US); William Gauthier, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/765,454

(22) Filed: Apr. 22, 2010

(65) Prior Publication Data

US 2011/0263802 A1 Oct. 27, 2011

(51) Int. Cl.
| | | |
|---|---|---|
| C08F 4/64 | (2006.01) |
| B01J 37/00 | (2006.01) |
| C08F 10/00 | (2006.01) |
| B01J 37/04 | (2006.01) |
| C08F 110/02 | (2006.01) |

(52) U.S. Cl.
CPC .............. *C08F 10/00* (2013.01); *B01J 37/00* (2013.01); *B01J 37/04* (2013.01); *C08F 110/02* (2013.01)

(58) Field of Classification Search
CPC .... C08F 4/64; B01J 37/00; B01J 37/03; B01J 37/04
USPC ........................................................ 502/104
See application file for complete search history.

(56) References Cited

U.S. PATENT DOCUMENTS

| | | | |
|---|---|---|---|
| 3,111,305 A * | 11/1963 | Bates | B01F 7/00141 366/325.92 |
| 3,737,393 A * | 6/1973 | de Vries | 502/153 |
| 4,271,060 A | 6/1981 | Hubby | |
| 4,543,399 A | 9/1985 | Jenkins, III et al. | |
| 4,588,790 A | 5/1986 | Jenkins, III et al. | |
| 4,617,284 A * | 10/1986 | Matsuura | C08F 10/00 502/104 |
| 5,001,205 A | 3/1991 | Hoel | |
| 5,028,670 A | 7/1991 | Chinh et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 10/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 5,945,366 A | 8/1999 | Kataoka et al. | |
| 6,147,173 A | 11/2000 | Holtcamp | |
| 6,174,971 B1 * | 1/2001 | Chen et al. | 526/125.3 |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,399,837 B1 | 6/2002 | Wilson et al. | |
| 6,420,580 B1 | 7/2002 | Holtcamp et al. | |
| 6,734,134 B1 | 5/2004 | Gray et al. | |
| 7,473,664 B2 * | 1/2009 | Vizzini et al. | 502/133 |
| 2002/0072577 A1 * | 6/2002 | Jacobsen | C08F 10/00 526/129 |
| 2004/0122188 A1 * | 6/2004 | Burns et al. | 526/90 |

(Continued)

FOREIGN PATENT DOCUMENTS

| | | |
|---|---|---|
| CN | 1856363 | 11/2006 |
| CN | 101472679 | 7/2009 |

(Continued)

OTHER PUBLICATIONS

Taiwanese Office Action issued in TW 100104931, dated Nov. 24, 2014, 31 pages, with English translation.
Extended European Office Action issued in EP 11772415.3, dated Apr. 23, 2015, 9 pages.
Office Action issued in European Application No. 11772415.3, dated Dec. 22, 2015, 6 pages.

*Primary Examiner* — Rip A Lee (74) *Attorney, Agent, or Firm* — Albert Shung (57) ABSTRACT

Methods of forming a catalyst, catalysts, polymerization processes and polymers formed therefrom are described herein. The method of forming a catalyst generally includes contacting an alkyl magnesium compound with an alcohol to form a magnesium alkoxide compound; contacting the magnesium alkoxide compound with a first titanium alkoxide and a first agent to form a reaction product "A", wherein the titanium alkoxide and the first agent are nonblended individual components prior to contacting the magnesium alkoxide; and sequentially contacting the reaction product "A" with a second agent, followed by a third agent, and subsequently a first reducing agent to form a catalyst component.

25 Claims, 4 Drawing Sheets

(56) References Cited

U.S. PATENT DOCUMENTS

| | | | |
|---|---|---|---|
| 2004/0152850 A1* | 8/2004 | Payer et al. | 526/124.3 |
| 2005/0209094 A1 | 9/2005 | Knoeppel et al. | |
| 2007/0003720 A1* | 1/2007 | Gray et al. | 428/35.7 |
| 2007/0093378 A1 | 4/2007 | Thorman | |
| 2007/0185288 A1* | 8/2007 | Siraux | C08F 10/00 |
| | | | 526/64 |
| 2007/0191558 A1* | 8/2007 | Gonzalez et al. | 526/124.3 |
| 2007/0299224 A1* | 12/2007 | Vizzini | B01J 31/122 |
| | | | 526/176 |
| 2009/0023875 A1* | 1/2009 | Vizzini | C08F 10/00 |
| | | | 526/154 |
| 2009/0203856 A1* | 8/2009 | Vizzini | C08F 10/02 |
| | | | 526/119 |

FOREIGN PATENT DOCUMENTS

| | | |
|---|---|---|
| CN | 102146203 A | 8/2011 |
| WO | 2005032714 A1 | 4/2005 |

* cited by examiner

FIG. 1

— catalyst 1, D50=4.9microns, span=1.5
— reference catalyst, D50=7.0micron, span-1.9
······ catalyst 1 fluff, D50=196micron, B.D=0.24 gcc, 0.0%fines. span=1.1
·········· reference catalyst fluff, D50=194micron, span=1.2, 0.0%fines, B.D.=0.41 g/cc

FIG. 2

— catalyst 2 (0.10 TEAl), D50=16.2micron, span=1.5
— catalyst 1 (no TEAL), D50=4.9micron, span=1.5
······ catalyst 2 fluff, D50=467micron, span=1.2, 0.0%fines, B.D.=0.35 g/cc
·········· catalyst 1 fluff, D50=196micron, B.D=0.24 gcc, 0.0%fines. span=1.1

FIG. 3

— catalyst 2 (0.10 TEAl), D50=16.2micron, span=1.5
— catalyst 3 (0.10 TEAl, 25% hexane reduction), D50=12.0micron, span=3.5
⋯ catalyst 2 fluff, D50=467micron, span=1.2, 0.0%fines, B.D.=0.35 g/cc
⋯ catalyst 3 fluff, D50=316micron, span=1.0, 0.0%fines, B.D.=0.40 g/cc

FIG. 4

— catalyst 4 (0.10 TEAL, 250RPM), D50=11.7micron, span=4.6
— catalyst 3 (0.10 TEAl, 350RPM), D50=12.0micron, span=3.5
⋯ catalyst 5 (0.05 TEAl, 350RPM), D50=7.6micron, span=4.5
⋯ catalyst 6 (0.10 TEAl, 500RPM), D50=10.5micron, span=6.2

FIG. 5

— catalyst 6, (0.10 TEAl, 3-blades metal impeller), D50=10.5micron, span=6.2
······ catalyst 7 (0.10 TEAl, 4-blades teflon impeller), D50=7.3micron, span=1.6

FIG. 6

---- catalyst 8 fluff, D50=157micron, span=0.8, 0.0%fines, B.D=0.42g/cc
— catalyst 9 fluff, D50=198micron, span=0.9, 0.0%fines, B.D.=0.42g/cc
······ catalyst 10 fluff, D50=236micron, span=0.8, 0.0%fines, B.D=0.43g/cc
– – catalyst 8 (0.05TEAl, 40%hexane reduction), D50=4.9micron, span=2.7
— catalyst 9 (0.10TEAl, 40%hexane reduction), D50=7.2micron, span=21.0
······ catalyst 10 (0.25TEAl, 40%hexane reduction), D50=9.3micron, span=10.8

FORMATION OF ZIEGLER-NATTA CATALYST USING NON-BLENDED COMPONENTS

FIELD

Embodiments of the present invention generally relate to methods of forming Ziegler-Natta type catalyst compositions for olefin polymerization.

BACKGROUND

As reflected in the patent literature, many processes for forming Ziegler-Natta catalyst systems utilize blends of components. Unfortunately, such blends generally are specialty chemicals having a high production cost. In an effort to reduce cost, the use of cheaper raw components can undesirably produce catalysts with a much smaller $D_{50}$ particle size that not only slows catalyst synthesis but also yields polymer with poor morphology.

Therefore, a need exists to develop processes using cheaper components for forming larger particle size Ziegler-Natta catalysts capable of producing polymers having similar properties to polymers produced from catalysts formed from expensive blends. There exists a further desire to increase batch yields for catalyst production processes.

SUMMARY

Embodiments of the present invention include a method of forming a catalyst. The method generally includes contacting an alkyl magnesium compound with an alcohol to form a magnesium alkoxide compound; contacting the magnesium alkoxide compound with a first titanium alkoxide and a first agent to form a reaction product "A", wherein the titanium alkoxide and the first agent are nonblended individual components prior to contacting the magnesium alkoxide; and sequentially contacting the reaction product "A" with a second agent, followed by a third agent, and subsequently a first reducing agent to form a catalyst component.

One or more embodiments include the method of the preceding paragraph, wherein the alkyl magnesium compound is represented by the formula $MgR^1R^2$, wherein $R^1$ and $R^2$ are independently selected from $C_1$ to $C_{10}$ alkyls.

One or more embodiments include the method of any preceding paragraph, wherein the alkyl magnesium compound is selected from butyl ethyl magnesium, diethyl magnesium, dipropyl magnesium, dibutyl magnesium, and combinations thereof.

One or more embodiments include the method of any preceding paragraph, wherein the alcohol contacts the alkyl magnesium compound in an equivalent of from about 0.5 to about 6.

One or more embodiments include the method of any preceding paragraph, wherein the alcohol is represented by the formula $R^4OH$, wherein $R^4$ is selected from $C_2$ to $C_{20}$ alkyls.

One or more embodiments include the method of any preceding paragraph, wherein the alcohol is selected from butanol, isobutanol, 2-ethylhexanol, and combinations thereof.

One or more embodiments include the method of any preceding paragraph, wherein the first titanium alkoxide is represented by the formula $Ti(OR^5)_4$, wherein $R^5$ is selected from $C_2$ to $C_{20}$ alkyl groups.

One or more embodiments include the method of any preceding paragraph, wherein the first titanium alkoxide is selected from titanium 2-ethylhexyl alkoxide, titanium isopropoxide, titanium n-butoxide, and combinations thereof.

One or more embodiments include the method of any preceding paragraph, wherein the first agent comprises a metal halide.

One or more embodiments include the method of any preceding paragraph, wherein the first agent comprises titanium halide.

One or more embodiments include the method of any preceding paragraph, wherein the second agent comprises a metal halide.

One or more embodiments include the method of any preceding paragraph, wherein the third agent comprises a metal halide.

One or more embodiments include the method of any preceding paragraph, the process further including shearing reaction product "A" with an impeller at an agitation rate while sequentially contacting the reaction product "A" with the second, and third agents in order to provide the catalyst component with a particle size distribution span of less than 2.

One or more embodiments include the method of any preceding paragraph, wherein the reducing agent is selected from an organolithium compound, an organomagnesium compound, an organoaluminum compound, and combinations thereof.

One or more embodiments include the method of any preceding paragraph, the process further including sequentially contacting the reaction product "A" with a second titanium alkoxide prior to contacting the second agent.

One or more embodiments include the method of the preceding paragraph, wherein the second titanium alkoxide is represented by the formula $Ti(OR^6)_4$, wherein $R^6$ is selected from $C_2$ to $C_{20}$ alkyl groups.

One or more embodiments include the method of the preceding paragraph, wherein the second titanium alkoxide is selected from titanium 2-ethylhexyl alkoxide, titanium isopropoxide, titanium n-butoxide, and combinations thereof.

One or more embodiments include the method of any preceding paragraph, flintier comprising contacting the alkyl magnesium compound with a viscosity modifier prior to contacting the alcohol to form a magnesium alkoxide compound.

One or more embodiments include the method of the preceding paragraph, wherein the viscosity modifier is represented by the formula $AlR^3_3$, wherein $R^3$ is selected from $C_1$ to $C_{10}$ alkyl compounds.

One or more embodiments include the method of the preceding paragraph, wherein the viscosity modifier is selected from trimethyl aluminum, triisobutyl aluminum, triethyl aluminum, n-octyl aluminum, n-hexyl aluminum, and combinations thereof.

One or more embodiments include the method of the preceding paragraph, wherein the viscosity modifier includes triethyl aluminum.

One or more embodiments wherein viscosity modifier is represented by the formula $AlR^3_3$ wherein $R^3$ is selected from $C_1$ to $C_{10}$ alkyl compounds and the viscosity modifier contacts the alkyl magnesium compound in an equivalent of from about 0.01 to about 0.6.

A catalyst component formed by the method of any preceding paragraph.

One or more embodiments include the catalyst component of the preceding paragraph, the catalyst component further including a particle size of at least about 5 microns.

One or more embodiments include a method of forming a catalyst including providing a blend including an alkyl magnesium compound and a viscosity modifier; contacting the blend with an alcohol to form a magnesium alkoxide compound; contacting the magnesium alkoxide compound with a first titanium alkoxide and a first agent to form a reaction product "A", wherein the titanium alkoxide and the first agent are nonblended individual components prior to contacting the magnesium alkoxide; and sequentially contacting the reaction product "A" with a second agent, followed by a third agent, and subsequently a first reducing agent to form a catalyst component.

One or more embodiments include a catalyst component formed by the method of the preceding paragraph.

One or more embodiments include the method of any preceding paragraph, wherein such method experiences increased catalyst yield over an identical process absent solvent reduction in presence of a viscosity modifier.

One or more embodiments include a method for polymerizing ethylene including contacting ethylene monomer with a catalyst to form polyethylene, wherein the catalyst is formed by a process including contacting an alkyl magnesium compound with an alcohol to form a magnesium alkoxide compound; contacting the magnesium alkoxide compound with a first titanium alkoxide and a first agent to form a reaction product "A", wherein the titanium alkoxide and the first agent are nonblended individual components prior to contacting the magnesium alkoxide; and sequentially contacting the reaction product "A" with a second agent, followed by a third agent, and subsequently a first reducing agent to form a catalyst component.

One or more embodiments include a polyethylene polymer formed by the method of the previous paragraph.

One or more embodiments include a method for polymerizing ethylene including contacting ethylene monomer with a catalyst to form polyethylene, wherein the catalyst is formed by a process including providing a blend comprising an alkyl magnesium compound and a viscosity modifier; contacting the blend with an alcohol to form a magnesium alkoxide compound; contacting the magnesium alkoxide compound with a first titanium alkoxide and a first agent to form a reaction product "A", wherein the titanium alkoxide and the first agent are nonblended individual components prior to contacting the magnesium alkoxide; sequentially contacting the reaction product "A" with a second agent, followed by a third agent, and subsequently a first reducing agent to form a catalyst component.

One or more embodiments include a polyethylene polymer formed by the method of the previous paragraph.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

As used herein, the term "room temperature" means that a temperature difference of a few degrees does not matter to the phenomenon under investigation, such as a preparation method. In some environments, room temperature may include a temperature of from about 20° C. to about 28° C. (68° F. to 82° F.), while in other environments, room temperature may include a temperature of from about 50° F. to about 90° F., for example. However, room temperature measurements generally do not include close monitoring of the temperature of the process and therefore such a recitation does not intend to bind the embodiments described herein to any predetermined temperature range.

The term "equivalent" refers to a molar ratio of a component to a starting material. As used herein, the starting material is either the alkyl magnesium compound or the magnesium metal, in some embodiments.

Catalyst Systems

Ziegler-Natta Catalysts systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR_x;$$

wherein M is a transition metal; R is a halogen, an alkoxy, or a hydrocarboxyl group; and x is the valence of the transition metal. For example, x may be from 1 to 4.

The transition metal may be selected from Groups IV through VIB (e.g., titanium, vanadium, or chromium), for example. R may be selected from chlorine, bromine, carbonates, esters, or an alkoxy groups in one embodiment. Examples of catalyst components include $TiCl_4$, $TiBr_4$, $Ti(OC_4H_9)_3Cl$, $Ti(OC_4H_9)_2Cl_2$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with an activator, which is also referred to in some instances as a "cocatalyst". Embodiments of Ziegler-Natta activators include organoaluminum compounds, such as trimethyl aluminum (TMA), triethyl aluminum (TEAl) and triisobutyl aluminum (TiBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene soluble material in the polymer. The internal electron donors may include amities, amides, esters, ketones, nitriles, ethers, thioethers, thioesters, aldehydes, alcoholates, salts, organic acids, phosphines, diethers, succinates, phthalates, malonates, maleic acid derivatives, dialkoxybenzenes or combinations thereof, for example. (See, U.S. Pat. Nos. 5,945,366 and 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds, for example. In one embodiment, the external donor may include diphenyldimethoxysilane (DPMS), cyclohexylmethyldimethoxysilane (CMDS), diisopropyldimethoxysilane (DUDS) and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, silica or alumina, for example.

Specific, non-limiting examples of formation processes for Ziegler-Natta catalysts are described in U.S. Pat. Nos. 6,734,134 and 6,174,971, which are incorporated by reference herein.

Embodiments of the invention generally include modifying the particle size of a catalyst through the introduction of a viscosity modifier (e.g., alkylaluminum) during catalyst formation. For example, the $AlR^3{}_3$ added in step 1 of below scheme functions as a viscosity modifier, not as a reducing agent, as the $AR^7{}_3$ added in the final step. A representative, non-limiting, illustration of a possible reaction scheme for use in embodiments of the invention may be illustrated as follows:

$$MgR^1R^2 + AlR^3{}_3 + 2R^4OH \rightarrow Mg(OR^4)_2 \quad \quad 1)$$

$$Mg(OR^4)_2 + Ti(OR^5)_4 + TiCl_4 \rightarrow \text{``}A\text{''}_{(soln.)} \quad \quad 2)$$

$$\text{``}A\text{''}_{(soln.)} + Ti(OR^6)_4 \rightarrow \text{``}B\text{''}_{(soln.)} \quad \quad 3)$$

$$\text{``}B\text{''}_{(soln.)} + TiCl_4 \rightarrow \text{``}C\text{''}_{(solid)} \quad \quad 4)$$

$$\text{``}C\text{''}_{(solid)} + TiCl_4 \rightarrow \text{``}D\text{''}_{(solid)} \quad \quad 4)$$

$$\text{``}D\text{''}_{(solid)} + TiCl_4 \rightarrow \text{``}E\text{''}_{(solid)} \quad \quad 6)$$

$$\text{``}E\text{''}_{(solid)} + AR^7{}_3 \rightarrow \text{Catalyst} \quad \quad 7)$$

Note that while the primary reaction components are illustrated above, additional components may be reaction products or used in such reactions and not illustrated above. Further, while described herein in terms of primary reaction steps, it is known to those skilled in the art that additional steps may be included in the reaction schemes and processes described herein (e.g., washing, filtering, drying, stirring, agitating, decanting steps), while it is further contemplated that other steps may be eliminated in certain embodiments. In addition, it is contemplated that any of the agents described herein may be added in combination with one another so long as the order of addition complies with the spirit of the invention.

As illustrated above, embodiments of the invention include methods of forming Ziegler-Natta catalysts. The methods generally include the formation and/or providing of a magnesium alkoxide compound represented by the formula $Mg(OR^4)_2$. In one embodiment, the magnesium alkoxide compound may be formed by contacting a magnesium containing compound with an alcohol to form the magnesium alkoxide compound. In one or more embodiments, this reaction is conducted at a reaction temperature of from room temperature to about 90° C. or from room temperature to about 85° C. for a time of up to about 10 hours, for example.

The magnesium containing compound may be represented by the formula:

$$MgR^1R^2;$$

wherein $R^1$ and $R^2$ are independently selected from $C_1$ to $C_{10}$ alkyl groups. Non-limiting illustrations of magnesium containing compounds include butyl ethyl magnesium (BEM), diethyl magnesium, dipropyl magnesium and dibutyl magnesium, for example.

The alcohol may be represented by the formula:

$$R^4OH;$$

wherein $R^4$ is selected from $C_2$ to $C_{20}$ alkyl groups. Non-limiting illustrations of alcohols include butanol, isobutanol and 2-ethylhexanol, for example. The alcohol may be added to the magnesium containing compound in an equivalent (i.e., per mole of [Mg]) of from about 0.5 to about 6 or from about 1 to about 3, for example.

In another embodiment, optionally, the method may further include contacting or blending the magnesium containing compound with a viscosity modifier to make the resultant solution more amenable for controlled, larger catalyst particle size precipitation. The viscosity modifier may include organoaluminum compounds represented by the formula:

$$AlR^3{}_3;$$

wherein $R^3$ is selected from $C_1$ to $C_{10}$ alkyl compounds. Non-limiting illustrations of the aluminum alkyl compounds generally include trimethyl aluminum (TMA), triisobutyl aluminum (TIBAl), triethyl aluminum (TEAl), n-octyl aluminum and n-hexyl aluminum, for example. In one specific embodiment, the viscosity modifier includes TEAl. In general, an increase in the amount of viscosity modifier added increases the catalyst $D_{50}$ particle size and improves fluff morphology. Thus, depending upon the desired catalyst particle size and fluff morphology, the viscosity modifier may be added to the magnesium-containing compound in a molar equivalent of from about 0.01 to about 0.6, or from about 0.05 to about 0.4 or from about 0.1 to about 0.3, for example.

In preparing the resultant magnesium alkoxide compound, the amount of alcohol $R^4OH$ added may be adjusted to convert all metal alkyls to non-reducing metal alkoxides. For example, the alcohol may be added to the magnesium-containing compound/viscosity modifier in a molar equivalent generally of from about 1 to about 6, or from about 1 to about 3 or from about 2 to about 3, for example.

It has been observed that utilizing a viscosity modifier with the magnesium-containing compound results in a catalyst having a larger particle size distribution than methods not including the viscosity modifier. For example, the catalyst generally has a particle size D50 (as measured by Malvern Hydro2000μp) of at least about 5 microns, or at least about 10 microns or at least about 15 microns, for example. In one or more embodiments, the catalyst of the embodiments has a particle size that is at least about 100%, or at least about 120% or at least about 200% greater than an identical catalyst absent the viscosity modifier.

In subsequent steps, prior efforts to sequentially form the Ziegler-Natta catalyst generally utilized blends of specialty chemicals having a high production cost. Accordingly, one or more embodiments of the present invention, either alone or in combination, generally include replacing blended agents, thereby reducing production cost while retaining one or more of the beneficial properties obtained via blends.

Therefore, embodiments include contacting the magnesium alkoxide compound with a second compound and a third compound to form a reaction product "A". The resulting reaction product "A" is a solution product. As used herein, "solution" refers to homogenous mixture of two or more compounds.

This reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon. Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

In one or more embodiments, this reaction is conducted at a temperature of from about 0° C. to about 100° C. Or from about 20° C. to about 90° C. for a time of from about 0.2 hours to about 24 hours or from about 1 hour to about 4 hours, for example.

The second compound is a titanium alkoxide generally represented by the formula:

$$Ti(OR^5)_4;$$

wherein $R^5$ is selected from $C_2$ to $C_{20}$ alkyl groups. Non-limiting illustrations of the second compound include titanium alkoxides, such as titanium 2-ethylhexyl alkoxide, titanium isopropoxide $Ti(OiPr)_4$, titanium n-butoxide $Ti(OBu)_4$, and combinations thereof. The titanium alkoxide may be added to the magnesium alkoxide compound in a molar equivalent of from about 0.25 to about 3, or from about 0.5 to about 2 or from about 0.5 to about 1, for example.

The third compound is a first metal halide. In one example, the first metal halide may be added to the magnesium alkoxide compound in a molar equivalent of from about 0.05 to about 2, or from about 0.1 to about 1 or from about 0.1 to about 0.5, for example.

The first metal halide may include any metal halide known to one skilled in the art, such as titanium tetrachloride ($TiCl_4$), for example.

Optionally, the method may further include contacting the reaction product "A" with titanium alkoxide to form reaction product "B". The resulting reaction product "B" is also a solution product. The titanium alkoxide is represented by the formula:

$$Ti(OR^6)_4;$$

wherein $R^6$ is selected from $C_2$ to $C_{20}$ alkyl groups. Non-limiting illustrations of titanium alkoxides include titanium 2-ethylhexyl alkoxide, titanium n-butoxide $Ti(OBu)_4$, titanium isopropoxide $Ti(OiPr)_4$, and combinations thereof. The titanium alkoxide may be added to the reaction product "A" in a molar equivalent of from about 0 to about 3 or from about 0 to about 1.0, for example.

The method may then include contacting reaction product "B" with a second metal halide to form a solid reaction product "C". This reaction may occur in the presence of an inert solvent. The inert solvents may include any of those solvents previously discussed herein, for example.

In one or more embodiments, this, reaction is conducted at a temperature of from about 0° C. to about 100° C. or from about 20° C. to about 90° C. for a time of from about 0.2 hours to about 36 hours or from about 1 hour to about 4 hours, for example.

The second metal halide may be added to reaction product "B" in an amount sufficient to precipitate solid reaction product "C" out of solution. The second metal halide may include any metal halide known to one skilled in the art, such as titanium tetrachloride ($TiCl_4$), for example. The second metal halide may contact reaction product "B" in a molar equivalent of from about 0.5 to about 5, or from about 1 to about 4 or from about 1.5 to about 2.5, for example.

The method may then include sequential halogenations steps. For example, the method may then include contacting solid reaction product "C" with a third metal halide to form solid reaction product "D". This reaction may occur in the presence of an inert solvent, for example. The inert solvents may include any of those solvents previously discussed herein, for example. Further, in one or more embodiments, the reaction is conducted at room temperature.

The third metal halide may include any metal halide known to one skilled in the art, such as $TiCl_4$, for example. The third metal halide may contact reaction product "C" in a molar equivalent of from about 0.25 to about 4, or from about 0.5 to about 3 or from about 0.75 to about 1.5, for example.

In a subsequent step, the method may then include contacting solid reaction product "D" with a fourth metal halide to form solid reaction product "E". This reaction may occur in the presence of an inert solvent, for example. The inert solvents may include any of those solvents previously discussed herein, for example. Further, in one or more embodiments, the reaction is conducted at room temperature.

The fourth metal halide may include any metal halide known to one skilled in the art, such as $TiCl_4$, for example.

The fourth metal halide may contact reaction product "D" in a molar equivalent of from about 0.25 to about 4, or from about 0.5 to about 3 or from about 0.75 to about 1.5, for example.

The method then includes reducing the reaction product "E" to form an active catalyst. In one embodiment, reaction product "E" is reduced by contacting the reaction product "E" with a reducing agent $AR^7{}_3$. The reducing agent may be added to the reaction product "E" in a molar equivalent of from about 0.02 to about 2, or from about 0.05 to about 0.5 or from about 0.1 to about 0.25, for example.

The reducing agent may be selected from organolithium compounds, organomagnesium compounds, organoaluminum compounds, and combinations thereof, for example. In one, non-limiting embodiment, the organoaluminum compound is represented by the formula:

$$AlR^7{}_3$$

wherein $R^7{}_3$ is selected from $C_1$ to $C_{10}$ alkyl compounds. Non-limiting illustrations of the aluminum alkyl compounds generally include trimethyl aluminium (TMA), triisobutyl aluminum (TIBAl), triethyl aluminum (TEAl), n-octyl aluminum and n-hexyl aluminum, for example. In one specific embodiment, the reducing agent includes TEAl. The resulting catalyst is suitable for the polymerization of olefins.

It has been found that utilizing the viscosity modifier $AlR^3{}_3$ in combination with the magnesium-containing compound advantageously reduces the viscosity of the reaction product $Mg(OR^4{}_2)$ compared to an identical process absent the viscosity modifier.

In yet another aspect, introducing the viscosity modifier in the first step of the catalyst synthesis scheme also advantageously leads to faster solid particle settling rate during synthesis. In one or more embodiments, the solids (e.g., intermediates) settling time is less than 15 minutes, for example.

Controlling the precipitation steps of the catalyst synthesis scheme by adjustments to either the concentration of the soluble catalyst precursor (i.e., [Mg]) or the precipitating agent (e.g. [TiCl$_4$]), or both, provides an effective means of adjusting the morphology of the solid catalyst component that results. For example, decreasing the concentration of the [Mg] in the catalyst synthesis solution may result in increased average particle size of the resulting catalyst component. While a similar control effect of decreasing [Mg] may be obtained via an intentional increase in the concentration of the diluent or solvent (e.g., hexane), such as by simply adding more solvent, however this undesirably leads to higher production cost.

To increase batch yield and reduce production cost, it may be desirable to reduce the amount of solvent at precipitation, however prior efforts have resulted in unacceptably small catalyst $D_{50}$ particle size due to a concomitant increase in [Mg]. It has been found that utilizing the viscosity modifier results in sufficiently large catalyst $D_{50}$ particle size even while cost saving measures such as reducing the quantity of solvent at precipitation is implemented. In one or more embodiments, hexane reduction at precipitation may be from about 5% to about 50%, or from about 15% to about 45% or from about 20% to about 40%. For example, in one or more embodiments, the catalyst has a $D_{50}$ particle size that is generally at least equal to, or at least about 50% greater or at least about 100% greater than a catalyst formed via an identical catalyst synthesis but without the viscosity modifier and without any hexane reduction at precipitation.

In one or more embodiments, the catalyst may exhibit a bimodal particle size distribution. Herein, a single catalyst including a plurality of particle size peaks is considered to be "bimodal". For example, a catalyst having a particle distribution span in excess of about 2.0 may exhibit a small peak at larger size particles typically at a particle size greater than about 30 microns. It has been found that the larger size particles may be effectively lessened by introducing an agitation impeller during precipitation. For example, in one or more embodiments, the agitation rate may be from about 250 rpm to about 500 rpm, for example, using a three-blade metal impeller. To further enhance shearing during precipitation, a four-blade impeller (e.g., a four-blade Teflon impeller) may be utilized to provide an even greater reduction in larger size particles.

To further reduce the solvent at the solid precipitation step and to increase the catalyst batch yield, it may be desirable to reduce or completely eliminate the addition of titanium alkoxide $Ti(OR^6)_4$ contacting the reaction product "A". The decreased solution volume at precipitation enables increased amounts of starting materials to be used to make a batch and avoid the reactor being liquid full in the otherwise condition. Moreover, metal alkoxides are able to consume TiCl$_4$ during precipitation; therefore reducing or eliminating $Ti(OR^6)_4$ may ensure that a complete MgCl$_2$ precipitation is realized. For example, in one or more embodiments, a catalyst may be synthesized without $Ti(OR^6)_4$, wherein reaction product "A" is sequentially combined with TiCl$_4$ in one or more steps (e.g., steps 4, 5 and 6 of the synthesis scheme) prior to being combined with a reducing agent in the final step.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norhornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization.

The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375 and 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C. for example. Reaction heat may be removed through the loop wall via any suitable method, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. %, or at least about 90 wt. % polyethylene relative to the total weight of polymer, for example.

The ethylene based polymers may have a density (as measured by ASTM D-792) of from about 0.86 g/cc to about 0.98 g/cc, or from about 0.88 g/cc to about 0.965 g/cc, or from about 0.90 g/cc to about 0.965 g/cc, or from about 0.925 g/cc to about 0.97 g/cc, for example.

The ethylene based polymers may have a melt index ($MI_2$) (as measured by ASTM D-1238) of from about 0.01 dg/min to about 100 dg/min., or from about 0.01 dg/min. to about 25 dg/min., or from about 0.03 dg/min. to about 15 dg/min., or from about 0.05 dg/min. to about 10 dg/min, for example.

In one or more embodiments, the polymers include low density polyethylene.

In one or more embodiments, the polymers include linear low density polyethylene.

In one or more embodiments, the polymers include medium density polyethylene. As used herein, the term "medium density polyethylene" refers to ethylene based polymers having a density of from about 0.92 g/cc to about 0.94 g/cc or from about 0.926 g/cc to about 0.94 g/cc, for example.

In one or more embodiments, the polymers include high density polyethylene. As used herein, the term "high density polyethylene" refers to ethylene based polymers having a density of from about 0.94 g/cc to about 0.97 g/cc, for example.

It has been found that an advantage of utilizing the viscosity modifier $AlR^3{}_3$ in combination with the magnesium-containing compound results in an improved polymer bulk density. In some embodiments the bulk density value may be greater than about 0.25 g/cc, and in other embodiments greater than about 0.35 g/cc, and in still other embodiments greater than about 0.40 g/cc, despite that the catalyst $D_{50}$ particle size may be much greater than an identical catalyst synthesis absent the viscosity modifier in the first step.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

EXAMPLES

In an effort to reduce the production cost of catalyst synthesis, this first example illustrates the effect of replacing expensive blends typically utilized in prior catalyst synthesis schemes with less expensive raw materials as described above with respect to two steps of the present invention. For comparison purposes, one example of a prior catalyst synthesis scheme is generally illustrated as follows:

$$MgR^1R^2 + 2R^3OH \rightarrow Mg(OR^3)_2 \quad \quad 1)$$

$$Mg(OR^3)_2 + ClA(O_xR^4)_y \rightarrow A_{(soln.)} \quad \quad 2)$$

$$A_{(soln.)} + TiCl_4/Ti(OR^5)_4 \rightarrow B_{(solid)} \quad \quad 3)$$

$$B_{(soln.)} + TiCl_4 \rightarrow C_{(solid)} \quad \quad 4)$$

$$C_{(solid)} + TiCl_4 \rightarrow D_{(solid)} \quad \quad 5)$$

$$\text{``}D\text{''}_{(solid)} + TiCl_4 \rightarrow \text{``}E\text{''}_{(solid)} \quad \quad 6)$$

$$\text{``}E\text{''}_{(solid)} + AR^7{}_3 \rightarrow \text{Catalyst} \quad \quad 7)$$

wherein $ClA(O_xR^4)_y$ and $TiCl_4/Ti(OR^5)_4$ in the second and third steps are typically expensive blends such as $ClTi(OiPr)_3$ and $2TiCl_4/Ti(OBu)_4$, respectively. A catalyst made with these expensive blends $ClTi(OiPr)_3$ and $2TiCl_4/Ti(OBu)_4$, in accordance the prior catalyst synthesis scheme, is referred to herein as a reference catalyst.

In accordance with one or more embodiments of the present invention, catalyst 1 was prepared using a similar synthesis scheme, wherein less expensive materials $TiCl_4$ and $Ti(OR^5)_4$ were utilized instead of $ClTi(OiPr)_3$ in step (2), and $Ti(OR^6)_4$ was utilized instead of $2TiCl_4/Ti(OBu)_4$ in step (3). Specifically, in step (1), magnesium ethoxide was (brined by combining butyl ethyl magnesium (BEM) with 2-ethylhexanol (2-EHOH) in a molar ratio of 1:2.2. Subsequently, in step (2), titanium isopropoxide $Ti(OiPr)_4$ and $TiCl_4$ were added to the magnesium ethoxide in equivalent molar ratios of 0.75:1 and 0.25:1 (i.e., per mole of Mg), respectively, to form reaction product solution "A". Next, in step 3, titanium n-butoxide (TNBT) was added to reaction product solution "A" in an equivalent molar ratio of 0.5:1 to form reaction product solution "B". In the following steps, reaction product "B" is sequentially combined with $TiCl_4$ in three steps (e.g., steps 4, 5 and 6 of the synthesis scheme) prior to being combined with a reducing agent in the final step.

Figure 1:
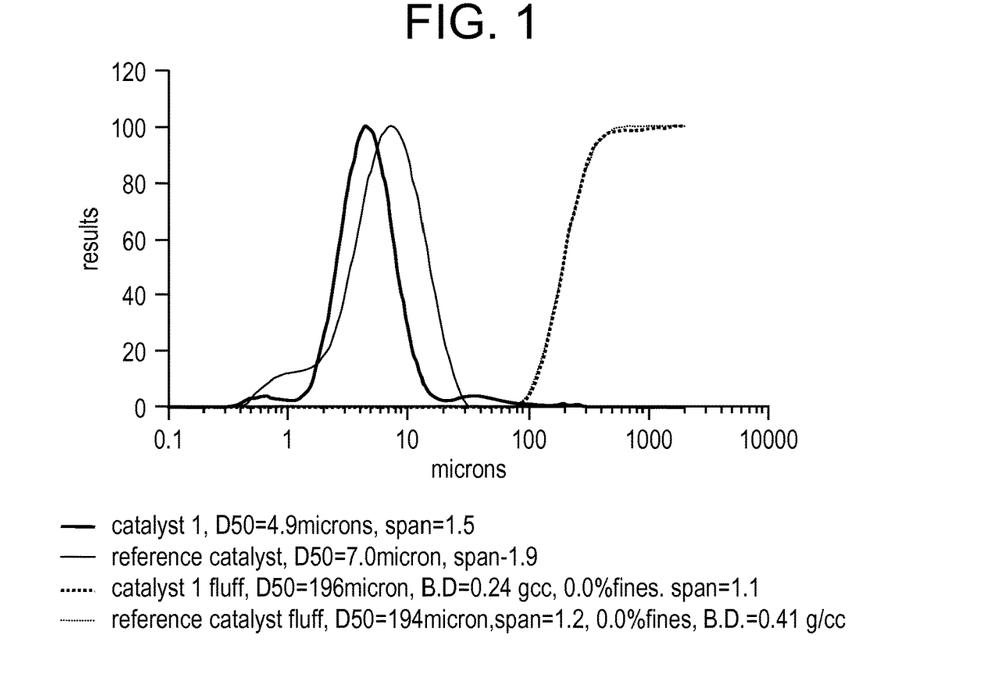
FIG. 1 is a graph of the particle size distribution of formed catalyst 1 as compared to a reference catalyst and their formed fluffs.

The volume average particle size distribution of the formed catalyst 1 and reference catalyst are shown in FIG. 1. As shown, catalyst 1 has a unimodal distribution, however its average $D_{50}$ particle size equal to about 5 microns is smaller than the reference catalyst that has an average $D_{50}$ particle size of about 8 microns. Further, the fluff made with catalyst 1 has lower bulk density, 0.24 g/cc, than the fluffs made with the reference catalyst, 0.41 g/cc.

Figure 2:
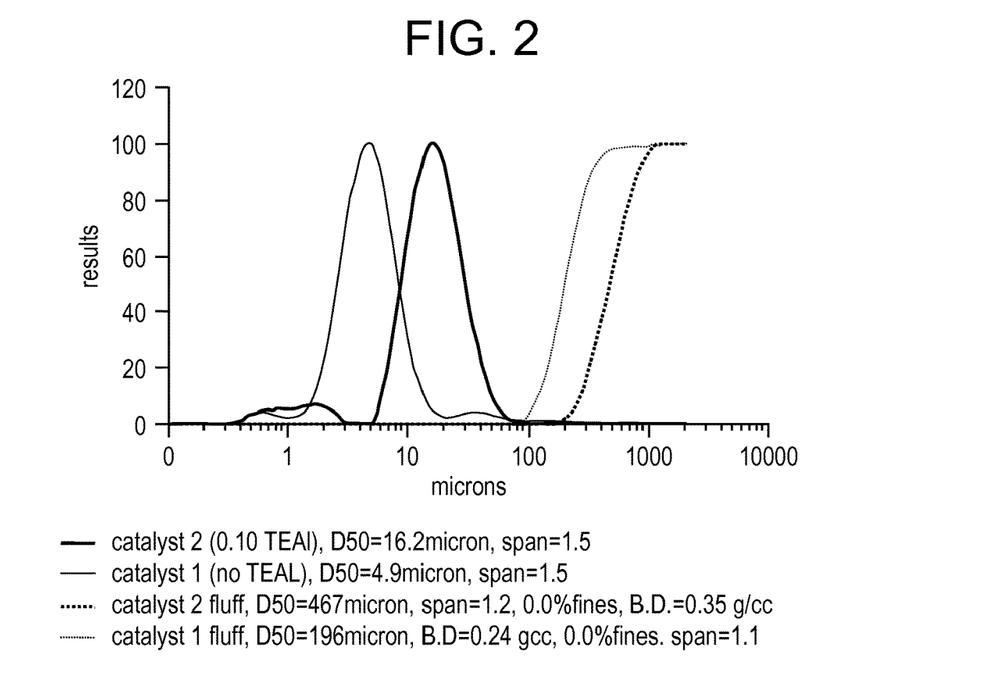
FIG. 2 is a graph of the particle size distribution of formed catalysts 1 and 2 and their formed fluffs.

In a second example, the catalyst synthesis scheme includes contacting or blending the magnesium containing compound $MgR^1R^2$ with the viscosity modifier $AlR^3{}_3$ to make the resultant solution more amenable for controlled, larger catalyst particle size precipitation. In accordance with one or more embodiments of the present invention, catalyst 2 was prepared using the same general synthesis scheme used to prepare catalyst 1 except that in step (1) $AlR^3{}_3$ was blended with $MgR^1R^2$ prior to contacting the alcohol $R^4OH$. In particular, in step (1), magnesium alkoxide was formed by combining a blend of butyl ethyl magnesium (BEM) and triethyl aluminum (TEAl) having a molar ratio of 1:0.10 with 2-ethylhexanol (2-EHOH). The 2-ethylhexanol was added in sufficient quantity to convert all metal-alkyls to non-reducing metal-alkoxides. For comparison purposes, FIG. 2 shows the volume average particle size distributions of catalyst 1 and catalyst 2. As shown, catalyst 2 has a much larger average $D_{50}$ particle size equal to about 16.2 microns as compared to catalyst 1 which has a $D_{50}$ particle size of about 5 microns.

In addition, when screened for polymerization under similar conditions, catalyst 2 clearly exhibits an improved polymer bulk density as compared to catalyst 1. FIG. 2 shows the cumulative polymer particle size distribution for standard polymerization using catalysts 1 and 2. As shown, catalyst 2 has a polymer bulk density of 0.35 g/cc as compared to catalyst 1 which has a polymer bulk density of 0.24 g/cc, despite that the $D_{50}$ particle size of catalyst 2 is more than 200% larger than the $D_{50}$ particle size of catalyst 1. Thus, as demonstrated in this example, introducing the reducing agent $AlR^3{}_3$ in step (1) of the catalyst synthesis scheme results in significantly larger particle precipitation as well as improves polymer bulk density.

Figure 3:
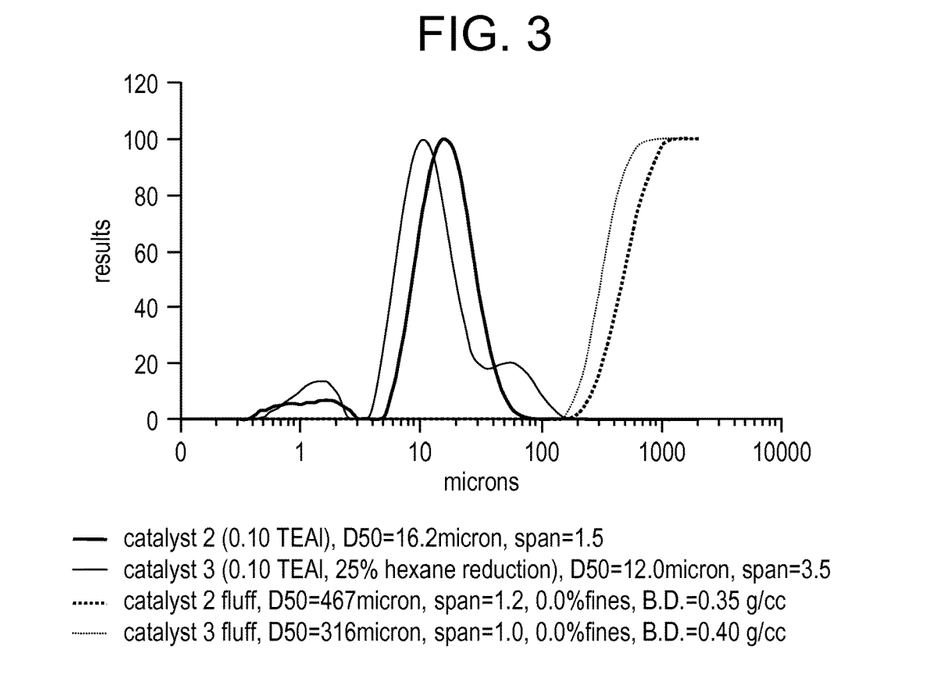
FIG. 3 is a graph of the particle size distribution of formed catalysts 2 and 3 and their fluffs.
Figure 4:
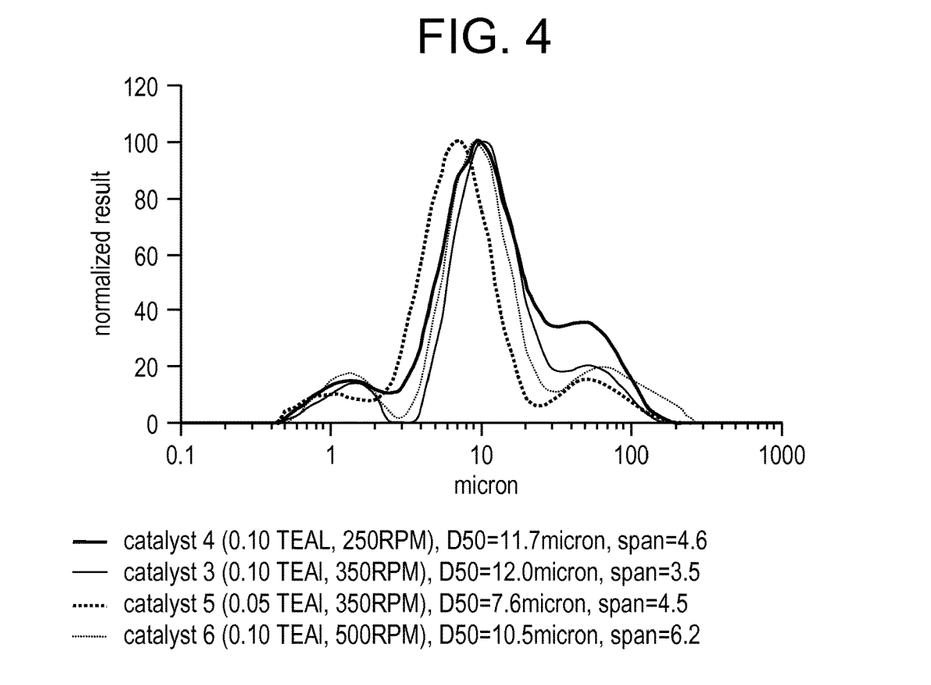
FIG. 4 is a graph of the particle size distribution of formed catalysts 3, 4, 5 and 6.

In a third example, catalyst synthesis is carried out with a 25% solvent reduction at precipitation for the purpose of increasing batch yield and reducing production cost. In accordance with one or more embodiments of the present invention, catalyst 3 was prepared using the same general synthesis scheme used to prepare catalyst 2 except that in the precipitation steps (4), the quantity of solvent used was about 25% less than the quantity of solvent used in precipitation steps (4), (5) and (6) during the synthesis of catalyst 2. Catalyst synthesis of each of the catalysts 1, 2 and 3 utilized hexane as the solvent. For comparison purposes, FIG. 3 shows the volume average particle size distributions of catalyst 2 and catalyst 3. As shown, catalyst 3 has a smaller average $D_{50}$ particle size equal to about 12.0, as compared to catalyst 2 which has a $D_{50}$ particle size of about 16.2 microns. A smaller $D_{50}$ particle size of catalyst 3 is expected with an increase in [Mg] during precipitation due to the 25% hexane solvent reduction. However, it is notable that even with a 25% solvent reduction, catalyst 3 demonstrates a larger $D_{50}$ particle size as compared to both catalyst 1 and the reference catalyst which were formed without a viscosity modifier (e.g., TEAl) in step (I) of the synthesis scheme. The fluffs made with catalyst 3 also show good bulk density.

Furthermore, catalyst 3 exhibits a bimodal particle size distribution, wherein there is a relatively small peak at larger particle sizes in excess of about 30 microns, as indicated by its particle distribution span equal to about 3.5. In accordance with one or more embodiments of the present invention, several additional catalysts were synthesized (with a 25% solvent reduction at precipitation) to demonstrate the effectiveness of utilizing a three-blade metal impeller and a lour-blade Teflon impeller to increase shearing during precipitation in an effort to reduce the peak at larger particle sizes. Specifically, catalysts 4, 6 and 7 were prepared in accordance with the synthesis scheme used to prepare catalyst 3, wherein in step (1), viscosity modifier TEAl was blended with BEM in a molar ratio of about 0.10:1. Catalyst 5 was also prepared in accordance with the scheme used to prepare catalyst 3, however with a molar ratio of viscosity modifier TEAl to BEM equal to about 0.05:1. Table 1 lists the resulting particle distribution spans of catalysts 3, 4, 5, and 6 prepared using three different impeller speeds during precipitation. For catalyst synthesis using the three-blade metal impeller, the smallest particle distribution span was achieved using an impeller speed of 350 rpm (catalyst 3).

Figure 5:
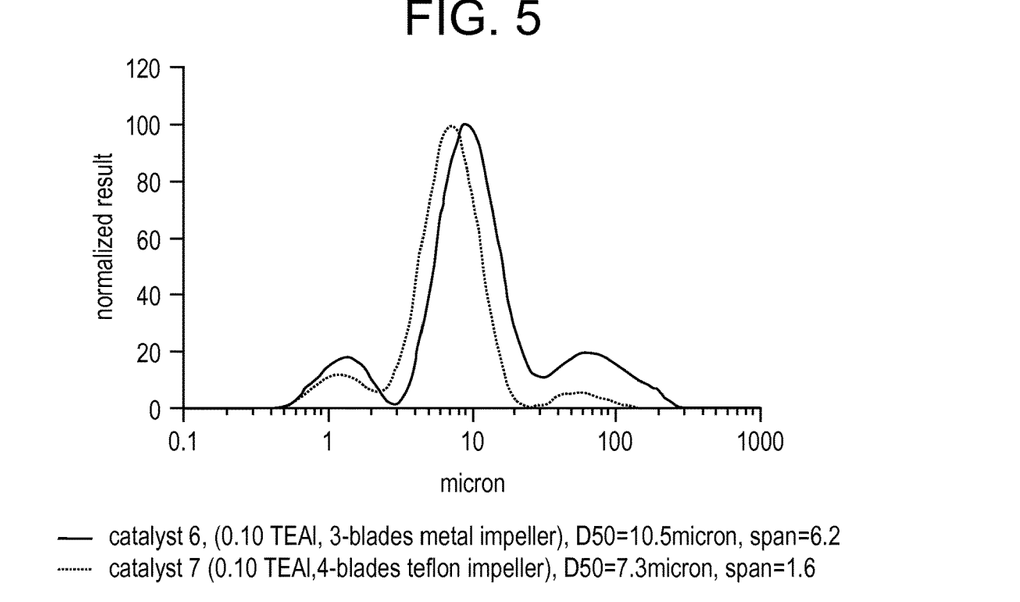
FIG. 5 is a graph of the particle size distributions of formed catalyst 6 and 7.

Neither decreasing the three-blade impeller speed to 250 rpm (catalyst 4) nor increasing the impeller speed to 500 rpm (catalyst 6) demonstrated any improvement in decreasing the catalyst particle distribution span. Furthermore, decreasing the concentration of the viscosity modifier TEAl (catalyst 5) also did not demonstrate any improvement in decreasing the catalyst particle distribution span. In FIG. 5, however surprisingly, using the four-blade Teflon® impeller during synthesis (catalyst 7) demonstrated vast improvement in decreasing the catalyst particle distribution span to a value of about 1.6. In addition to the extra blade, the four-blade Teflon® impeller has a thicker blade that may contribute to more efficient shearing of the catalyst during precipitation.

TABLE 1

| Catalyst | AlR$^3_3$ | AlR$^3_3$/Mg | 3-blade impeller speed | 4-blade impeller speed | particle distribution span |
|---|---|---|---|---|---|
| 3 | TEA1 | 0.10 | 350 rpm | — | 3.5 |
| 4 | TEA1 | 0.10 | 250 rpm | — | 4.6 |
| 5 | TFA1 | 0.05 | 350 rpm | — | 4.5 |
| 6 | TEA1 | 0.10 | 500 rpm | — | 6.2 |
| 7 | TEA1 | 0.10 | — | 500 rpm | 1.6 |

Figure 6:
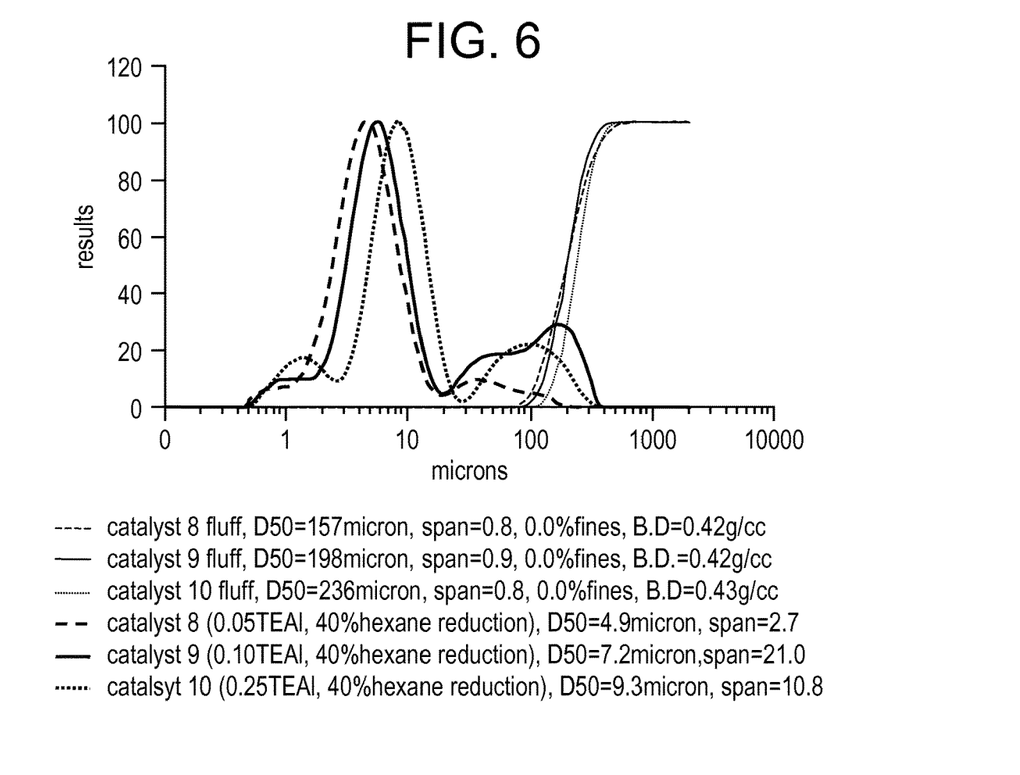
FIG. 6 is a graph of particle size distributions of formed catalyst 8, 9, 10 and their formed fluffs.

In a fourth example, catalyst synthesis is carried out with a 40% solvent reduction at precipitation for the purpose of further increasing batch yield and reducing production cost. In accordance with one or more embodiments of the present invention, catalysts 8, 9 and 10 were prepared using the same general synthesis scheme used to prepare catalyst 2 except that in the precipitation steps (4), (5) and (6), the quantity of hexane solvent used was about 40% less than the quantity of hexane used in precipitation steps (4), (5) and (6) during the synthesis of catalyst 2. Furthermore, 40% solvent reduction at precipitation was studied as a function of the concentration of viscosity modifier AlR$^3_3$ blended with MgR$^1$R$^2$. Table 2 lists the concentration of viscosity modifier TEAl utilized during synthesis, the average D$_{59}$ particle size, and the particle size distribution spans for each of the catalysts. The data shows that an increase in viscosity modifier (TEAl) in step (1) of the catalyst synthesis scheme increases the average D$_{50}$ particle size of the resulting catalyst. Furthermore, increasing the viscosity modifier concentration from a molar ratio of 0.10 to 0.25 may also decrease the particle distribution span, as demonstrated by catalysts 9 and 10. FIG. 6 shows the particle size distribution of catalysts and fluffs made with the catalysts.

TABLE 2

| Catalyst | AlR$^3_3$ | AlR$^3_3$/Mg | D$_{50}$ particle size | particle distribution span |
|---|---|---|---|---|
| 8 | TEA1 | 0.05 | 4.9 microns | 2.7 |
| 9 | TEA1 | 0.10 | 7.2 microns | 21.0 |
| 10 | TEA1 | 0.25 | 9.3 microns | 10.8 |

In a fifth example, catalyst synthesis is carried out without the addition of titanium alkoxide Ti(OR$^6$)$_4$ in step (3) of the synthesis scheme to determine the effect of decreasing the concentration of metal alkoxides on improving catalyst morphology with 40% hexane reduction at precipitation, and on catalyst yield due to the competing effect of the presence of metal alkoxides that may consume TiCl$_4$ during precipitation. In accordance with one or more embodiments of the present invention, catalysts 11 and 12 were prepared using the same general synthesis scheme used to prepare catalyst 2, except that in forming catalyst 12 there was no addition of Ti(OR$^6$)$_4$, in step (3), and except that in forming catalysts 11 and 12 the quantity of hexane solvent used in the precipitation steps (4), (5) and (6) was about 40% less than the quantity of hexane used in precipitation steps (4), (5) and (6) during the synthesis of catalyst 2. Table 3 summarizes several of the components and corresponding quantities used (per mole of Mg) during catalyst synthesis.

TABLE 3

| Catalyst | AlR$^3_3$ | AlR$^3_3$/Mg | Ti(OR$^6$)$_4$ | Ti(OR$^6$)$_4$/Mg |
|---|---|---|---|---|
| 11 | TEA1 | 0.10 | TNBT | 0.50 |
| 12 | TEA1 | 0.10 | none | none |

Figure 7:
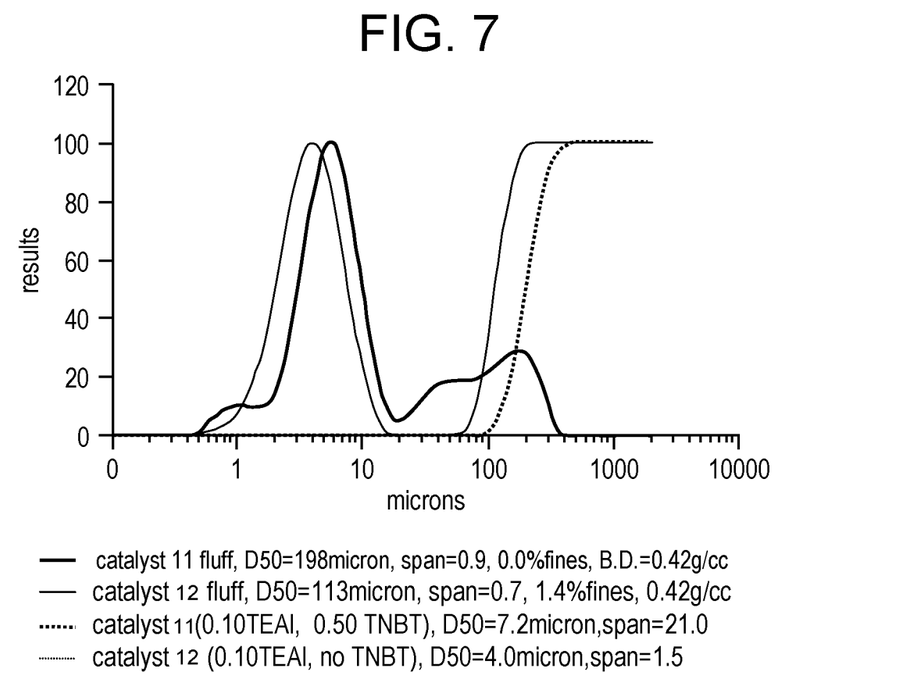
FIG. 7 is a graph of the particle size distribution of formed catalysts 9 and 11 and their formed fluffs.

FIG. 7 shows the volume average particle size distributions of catalyst 11 and catalyst 12. As shown, catalyst 11 exhibits an average D$_{50}$ particle size equal to about 7.2 microns and a particle distribution span of about 21.0, and catalyst 12 exhibits a D$_{50}$ particle size of about 4.0 microns and particle distribution span of about 1.5. Catalyst synthesis without step (3) (i.e., without the addition of Ti(OR$^6$)$_4$) and with a 40% hexane reduction at precipitation demonstrates a good unimodal particle distribution or improvement in particle distribution span, while less desirably providing somewhat smaller D$_{50}$ particle size.

While the foregoing is directed to embodiments of the present invention, other and further embodiments of the invention may be devised without departing from the basic scope thereof and the scope thereof is determined by the claims that follow.

What is claimed is:

1. A method of forming a catalyst component comprising:
    contacting an alkyl magnesium compound with an alcohol and a viscosity modifier, wherein the viscosity modifier is an alkyl aluminum represented by the formula AlR$^3_3$, wherein R$^3$ is selected from C$_1$ to C$_{10}$ alkyl groups, to form a magnesium alkoxide compound;
    contacting the magnesium alkoxide compound with a first titanium alkoxide and a first agent to form a reaction product solution "A", wherein the first titanium alkoxide and the first agent are nonblended individual components prior to contacting the magnesium alkoxide compound, and wherein first agent comprises a metal halide; and sequentially contacting the reaction product solution "A" with a second titanium alkoxide of the formula Ti(OR$^6$)$_4$ wherein R$^6$ is selected from C$_2$ to C$_{20}$ alkyl groups, followed by a third agent, and subsequently a reducing agent, wherein the reducing agent is an organolithium compound, an organomagnesium compound, an organoaluminum compound, or combinations thereof, to form a catalyst component;
    shearing reaction product solution "A" with an impeller at an agitation rate while sequentially contacting the reaction product solution "A" with the second titanium alkoxide and third agent in order to provide the catalyst component with a particle size distribution span of less than 2;
    and
    utilizing a solvent for precipitation of the catalyst component in an amount reduced by 5% to 50% compared to an identical catalyst component synthesis without the viscosity modifier, and wherein the catalyst component has a particle size $D_{50}$ (as measured by Malvern Hydro2000μP) of at least 10 microns.

2. The method of claim 1, wherein the alkyl magnesium compound is represented by the formula $MgR^1R^2$, wherein $R^1$ and $R^2$ are independently selected from $C_1$ to $C_{10}$ alkyls.

3. The method of claim 1, wherein the alkyl magnesium compound is selected from butyl ethyl magnesium, diethyl magnesium, dipropyl magnesium, dibutyl magnesium, and combinations thereof.

4. The method of claim 1, wherein the alcohol contacts the alkyl magnesium compound in a molar equivalent of from about 0.5 to about 6.

5. The method of claim 1, wherein the alcohol is represented by the formula $R^4OH$, wherein $R^4$ is selected from $C_2$ to $C_{20}$ alkyls.

6. The method of claim 1, wherein the alcohol is selected from butanol, isobutanol, 2-ethylhexanol, or combinations thereof.

7. The method of claim 1, wherein the first titanium alkoxide is represented by the formula $Ti(OR^5)_4$, wherein $R^5$ is selected from $C_2$ to $C_{20}$ alkyl groups.

8. The method of claim 1, wherein the first titanium alkoxide is selected from titanium 2-ethylhexyl alkoxide, titanium isopropoxide, titanium n-butoxide, or combinations thereof.

9. The method of claim 1, wherein the first agent comprises titanium halide.

10. The method of claim 1, wherein the third agent comprises a metal halide.

11. The method of claim 1, wherein the viscosity modifier is selected from trimethyl aluminum, triisobutyl aluminum, triethyl aluminum, n-octyl aluminum, n-hexyl aluminum, or combinations thereof.

12. The method of claim 1, wherein the viscosity modifier comprises triethyl aluminum.

13. The method of claim 1, wherein the viscosity modifier contacts the alkyl magnesium compound in a molar equivalent of from about 0.01 to about 0.6.

14. The method of claim 1, wherein the reducing agent is an organoaluminum compound represented by the formula $AlR^7_3$, wherein $R^7$ is selected from $C_1$ to $C_{10}$ alkyl groups.

15. The method of claim 14, wherein the organoaluminum compound is triethyl aluminum.

16. The method of claim 1, wherein the second titanium alkoxide is titanium 2-ethylhexyl alkoxide, titanium isopropoxide, and titanium n-butoxide.

17. The method of claim 1, wherein the alkyl magnesium compound is contacted with the viscosity modifier prior to contacting the alcohol.

18. The method of claim 1, wherein the magnesium alkoxide compound is a non-reducing magnesium alkoxide compound.

19. The method of claim 1, wherein the viscosity modifier contacts the alkyl magnesium compound in a molar equivalent of from about 0.1 to about 0.3.

20. The method of claim 1, wherein the impeller is a four blade impeller, and wherein the catalyst component has a particle size $D_{50}$ of at least 15 microns.

21. The method of claim 1, wherein the catalyst component has a particle size $D_{50}$ of at least 15 microns.

22. The method of claim 1, wherein the catalyst component has unimodal particle distribution.

23. The method of claim 1, wherein the catalyst component has bimodal particle distribution.

24. The method of claim 1, wherein the impeller speed is controlled to minimize particle distribution span.

25. The method of claim 1, wherein solvent reduction is reduced by about 25% compared to an identical catalyst component synthesis without the viscosity modifier.

* * * * *